UNITED STATES PATENT OFFICE.

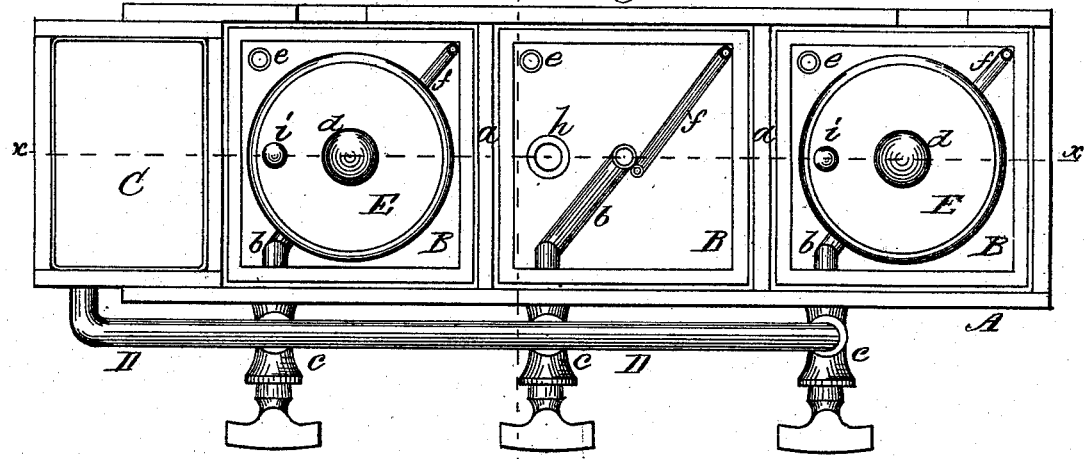
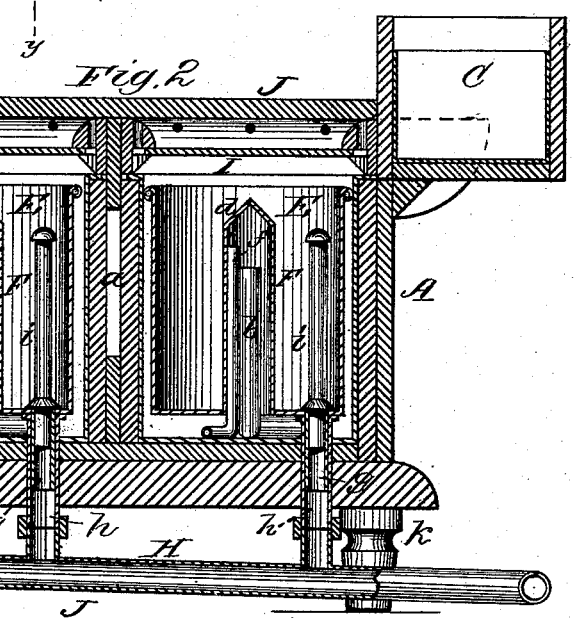
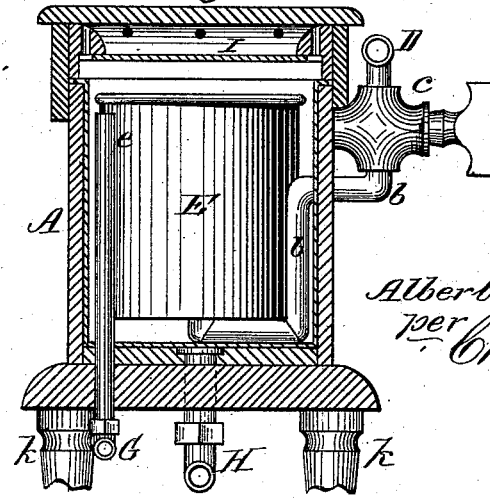

ALBERT R. BROWN, OF GUILFORD, NEW YORK.

MILK-COOLER.

SPECIFICATION forming part of Letters Patent No. 229,373, dated June 29, 1880.

Application filed June 20, 1879.

*To all whom it may concern:*

Be it known that I, ALBERT R. BROWN, of Guilford, in the county of Chenango and State of New York, have invented a new and valuable Improvement in Milk-Coolers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top-plan view of my invention. Fig. 2 is a vertical section on line $x\,x$ of Fig. 1; and Fig. 3 is a sectional view taken on line $y\,y$ of Fig. 1.

The present invention has relation to that class of devices employed for the purpose of reducing the natural temperature of milk or cooling it below that of the surrounding atmosphere; and has for its object to so construct a device of the above character that it will admit of the water or steam or hot water being conducted around the center of the milk, and also filling around the bottom and sides of the vessels or receptacles containing the milk, thereby removing the animal heat from the same very rapidly and keeping it at any temperature desired, either by the use of ice, cold water, hot water, or steam, as found necessary.

The invention consists of a can or vessel, or series of them, for containing the milk, having a central tube closed at its top, and into which water or steam is introduced from a discharge-pipe, in connection with an air-pipe, overflow-pipe, and an arrangement of pipes and faucets for controlling the supply of water or steam into any one or all of the receptacles containing the cans or vessels, and also means for its escape, as will be hereinafter described, and subsequently pointed out in the claims.

In the accompanying drawings, A represents the frame, preferably of wood and of rectangular or other form. This frame A is divided into any desired number of compartments by partitions $h$, each compartment having a metal can, B, or, in other words, lined with galvanized iron or any other suitable metal to form a receptacle into which to place the cans containing the milk. The frame A, which I will term the "creamery," has at one end a tank, C, for containing water, and also ice or hot water, said tank being raised above the top of the frame A or creamery, so that a sufficient head of water is obtained to force it around the milk, as will be hereinafter described. Connecting with the tank C is a supply-pipe, D, running along the side of the frame and having branch pipes $b$, each of which communicates with the interior of its respective compartment or receptacle B. The branch pipes $b$, after passing through the side of the frame A, take a course downward to the bottom of the receptacles B, and then horizontally toward the center of the same, and upward in a vertical direction. These pipes are each provided with a faucet, $c$, so that the water can be conducted to each of the receptacles B independent of the other, or water let into them all, as the case may require, as well as in any desired quantity.

The can or vessel E, for holding the milk, is of circular form, and somewhat smaller in diameter than the receptacle B, in order to allow space between it and the can or vessel E for the water. The can or vessel E has a central tube, F, of any length or size desired, and extends in an upward direction near the top of the vessel, and is provided with a conical cap, $d$, which closes the top, but is open at the bottom. When the water is let on in one or all of the receptacles B it passes into the branch pipes $b$ and out at the top, and is deflected by the conical caps $d$, which throws it around the sides of the tubes F, cooling the milk in contact therewith, the cold water also filling around the bottom and up the sides of the can or vessel, and thus quickly removing the animal heat from the milk and keeping the same at any temperature desired, either by the use of ice, cold or hot water, or steam, as found desirable. The water, after filling up to the top of the tube F, discharges through an overflow-pipe, $e$, which connects with a horizontal pipe, G, under the frame or creamery A, said pipe conducting the water to any suitable trough or receptacle without the necessity of handling it.

Within each of the receptacles B is a small air-tube, $f$, passing down the side of the same and horizontally across the bottom to the pipe $b$, and thence vertically along the side of the pipe and above the upper end thereof, so that any air is allowed to escape that may collect in the tube when the water discharges. Otherwise, if the air-pipes were not employed, the water would not run in from the tank or spring, as the case may be, for the reason that the vacuum formed in the tube would not allow the water to run into the same and fill it.

The cans or vessels E are provided at their bottom with pipes $g$, communicating with the interior of the cans or vessels. These pipes $g$, when the cans or vessels E are in place, pass through the water at the bottom of the receptacles B, and fit within sleeves $h$, surrounding openings in the bottom of the frame or creamery A, said sleeves connecting with the milk-pipe H, for conducting the milk to the place desired without the necessity of handling it.

The opening in the cans or vessels through which the milk is discharged is closed by a plug or stopper, $i$, of rubber or other suitable material, which extends up a sufficient distance so as not to interfere with the cream on the surface of the milk and at the same time be conveniently withdrawn when it is desired to discharge the contents of the cans or vessels.

The receptacles B, at their top, are each provided with glass covers I, to exclude all flies, dust, or dirt, and the frame or creamery A has a hinged cover, J, the frame or creamery being supported on legs $k$. The frame or creamery may be of any suitable size, and the number of receptacles B may be either increased or diminished, as circumstances may require.

Having now fully described my invention, what I claim as new, and desire to secure by Letters Patent, is—

1. The receptacles B, containing removable cans or vessels E, having central tubes, F, in combination with the discharge-pipes $b$ and connecting with the supply-pipe D, substantially as and for the purpose set forth.

2. The receptacles B, containing removable cans or vessels E, having central tube, F, with conical cap $d$, in combination with the discharge-pipes $b$ and air-pipes $f$, substantially as and for the purpose described.

3. The frame A, divided into compartments by partitions $a$, each of which compartments contains a milk can or vessel, E, with central tube, F, and discharge-pipe $b$, and a removable glass cover, I, and hinged cover J, substantially as and for the purpose described.

4. The receptacles B, water-pipes $b$, and air-pipes $f$, in combination with the cans or vessels E, having central tube, F, substantially as and for the purpose described.

In testimony that I claim the above I have hereunto subscribed my name in the presence of two witnesses.

ALBERT R. BROWN.

Witnesses:
K. E. BUNNELL,
EDWIN H. STONE.